(12) United States Patent
Kantamneni et al.

(10) Patent No.: US 9,052,913 B2
(45) Date of Patent: Jun. 9, 2015

(54) DYNAMIC TOKEN RESOLUTION DURING COMPILATION

(75) Inventors: Harish Kantamneni, Redmond, WA (US); Andrew Cherry, Everett, WA (US); Anders Hauge, Seattle, WA (US); Amanda Silver, Seattle, WA (US); Nathan Carlson, Redmond, WA (US); Anthony Crider, Mill Creek, WA (US); Abhijeet S. Shah, Redmond, WA (US); Ming Hong Zhu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1259 days.

(21) Appl. No.: 12/775,481

(22) Filed: May 7, 2010

(65) Prior Publication Data

US 2011/0276953 A1  Nov. 10, 2011

(51) Int. Cl.
*G06F 9/45* (2006.01)

(52) U.S. Cl.
CPC ..................... *G06F 8/43* (2013.01)

(58) Field of Classification Search
CPC ............... G06F 8/20; G06F 8/30; G06F 8/41; G06F 8/427
USPC ......................................................... 717/143
See application file for complete search history.

(56) References Cited

U.S. PATENT DOCUMENTS

| | | | |
|---|---|---|---|
| 6,530,075 B1 | 3/2003 | Beadle et al. | |
| 6,973,646 B1 | 12/2005 | Bordawekar et al. | |
| 8,191,038 B1 * | 5/2012 | Samuel et al. | 717/106 |
| 2001/0034743 A1 * | 10/2001 | Thomas | 707/501.1 |
| 2004/0255268 A1 * | 12/2004 | Meijer et al. | 717/106 |
| 2006/0080648 A1 | 4/2006 | Anwar et al. | |
| 2006/0288353 A1 * | 12/2006 | King et al. | 719/331 |
| 2007/0038981 A1 * | 2/2007 | Hanson et al. | 717/114 |
| 2007/0201654 A1 | 8/2007 | Shenfield | |
| 2010/0088669 A1 * | 4/2010 | Cwalina et al. | 717/106 |
| 2010/0299660 A1 * | 11/2010 | Torgersen et al. | 717/148 |
| 2011/0138190 A1 * | 6/2011 | Chase et al. | 713/189 |

OTHER PUBLICATIONS

Auslander, et al., "Fast, Effective Dynamic Compilation", Retrieved at << http://www.cs.washington.edu/research/dyncomp/Papers/pldi96.pdf >>, In the proceedings of the ACM SIGPLAN Conference on Programming Language Design and Implementation (PLDI), May 1996, pp. 1-11.

(Continued)

*Primary Examiner* — Li B Zhen
*Assistant Examiner* — Bradford Wheaton
(74) *Attorney, Agent, or Firm* — Kevin Sullivan; Kate Drakos; Micky Minhas (57) ABSTRACT

A method includes, during compilation of a portion of source code at a compiler, initiating token resolution with respect to a token included in the portion of source code. A static context and a dynamic context of the compiler are queried to identify one or more lookup results of the token. A particular lookup result is selected to resolve the token based on one or more semantic rules of the compiler. The particular lookup result is selected independently of whether the particular lookup result is sourced from the static context or from the dynamic context. The method includes resolving the token based on the selected particular lookup result.

20 Claims, 3 Drawing Sheets

(56) References Cited

OTHER PUBLICATIONS

Lee, et al., "Optimizing ML with Run-Time Code Generation", Retrieved at << http://www.cs.tufts.edu/comp/150CMP/papers/Iee96optimizingml.pdf >>, Conference on Programming Language Design and Implementation, Proceedings of the ACM SIGPLAN 1996 conference on Programming language design and implementation, May 21-24, 1996, pp. 137-148.

Sandoval, et al., "Dynamic Compilation for Component-Based High Performance Computing", Retrieved at << http://compframe.org/cbhpc2009/proceedings/articles/paper15-Sandoval.pdf >>, Conference on High Performance Networking and Computing, Proceedings of the 2009 Workshop on Component-Based High Performance Computing, Nov. 15-16, 2009, pp. 4.

"Byte Compilation", Retrieved at << http://www.zvon.org/other/elisp/Output/SEC198.html >>, pp. 10.

"Unified Expression Language Support", Requirements for Unified Expression Language (EL) Support WTP 2.0/JSF 1.0 tooling, from Eclipsepedia, 2010, 9 pages.

Mac Dev Center: Xcode Debugging Guide: Modifying Running Code, Retrieved from http://developer.apple.com/mac/library/documentation/DeveloperTools/Conceptual/Xcode, Retrieved on Mar. 29, 2010, 3 pages.

* cited by examiner

DYNAMIC TOKEN RESOLUTION DURING COMPILATION

BACKGROUND

Source code that is used to create software applications may be compiled in a dynamic environment. In a dynamic environment, contextual information (e.g., the number and content of external references) that is needed by the compiler to successfully compile the source code can change. As a result, the contextual information may not easily be captured in a static (e.g., unchanging) context. Compilers typically require a programmer to provide all context information up front, i.e. prior to source code compilation. This context information typically includes a set of references and a number of compiler options. If the source code includes a token that is not found in the set of references provided to the compiler, the compilation process may fail unless additional (e.g., dynamic) information is provided to the compiler. However, it may be inconvenient and inefficient to generate all possible dynamic context information each time a compiler compiles source code that includes tokens associated with dynamic references.

SUMMARY

The present disclosure describes dynamic resolution of tokens present in source code (e.g., references to types, namespaces, and variables) during source code compilation. A compiler that performs source code compilation may have an associated static context (e.g., source files, reference assemblies, and compiler options) and an associated dynamic context. Rather than providing all dynamic context information to the compiler up front (e.g., "pushing" all of the dynamic information), an initial dynamic context may be kept small. During compilation, relevant dynamic context items (i.e., items that are referenced by the source code being compiled) may be provided to the compiler as needed (e.g., the compiler "pulls" the dynamic information related to source code segments, as needed). In one implementation, token resolution interfaces, such as a type resolution interface and a variable resolution interface, are provided to users (e.g., software developers) as part of a compiler. Users may create custom classes that implement the interfaces. For example, the custom classes may identify dynamic context items that may be used to resolve tokens. When the compiler encounters a token that the compiler does not "understand" (e.g., the token is not a reserved keyword of the compiler), the compiler queries the static context and the dynamic context. The static and dynamic contexts may return one or more lookup results of the token. A particular returned lookup result is selected and used to resolve the token. The particular lookup result used to resolve the token is selected independently of whether the particular lookup result was sourced from the static context or from the dynamic context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a computer-implemented method includes, during compilation of a portion of source code at a compiler, initiating token resolution with respect to a token included in the portion of source code. The method also includes querying a static context of the compiler and a dynamic context of the compiler to identify one or more lookup results of the token. The method further includes selecting a particular lookup result to resolve the token based on one or more semantic rules of the compiler. The particular lookup result is selected independently of whether the particular lookup result is sourced from the static context or from the dynamic context. The method includes resolving the token based on the selected particular lookup result.

In another particular embodiment, a computer system includes a processor and a compiler executable by the processor to initiate compilation of a portion of source code. The compiler is also executable to initiate token resolution with respect to a first token and a second token included in the portion of the source code. The compiler is further executable to query a static context of the compiler and a dynamic context of the compiler to identify one or more lookup results of the first token. The compiler is also executable to query the static context and the dynamic context to identify one or more lookup results of the second token. The compiler is executable to select a first particular lookup result of the first token based on one or more semantic rules of the compiler. The first particular lookup result is selected independently of whether the first particular lookup result is sourced from the static context or from the dynamic context. The compiler is further executable to select a second particular lookup result of the second token based on one or more semantic rules of the compiler. The second particular lookup result is selected independently of whether the second particular lookup result is sourced from the static context or from the dynamic context. The compiler is also executable to resolve the first token based on the selected first particular lookup result and to resolve the second token based on the selected second particular lookup result. The compiler is further executable to generate a compilation result.

In another particular embodiment, a computer-readable storage medium includes instructions that when executed by a computer system, cause the computer system to, during compilation of a portion of source code at a compiler, initiate token resolution with respect to a token included in the portion of source code. The instructions also cause the computer system to query a static context of the compiler and a dynamic context of the compiler to identify one or more lookup results of the token. The instructions further cause the computer system to select a particular lookup result to resolve the token based on one or more semantic rules of the compiler. The particular lookup result is selected independently of whether the particular lookup result is sourced from the static context or from the dynamic context. The instructions cause the computer system to resolve the token based on the particular lookup result.

Figure 1:
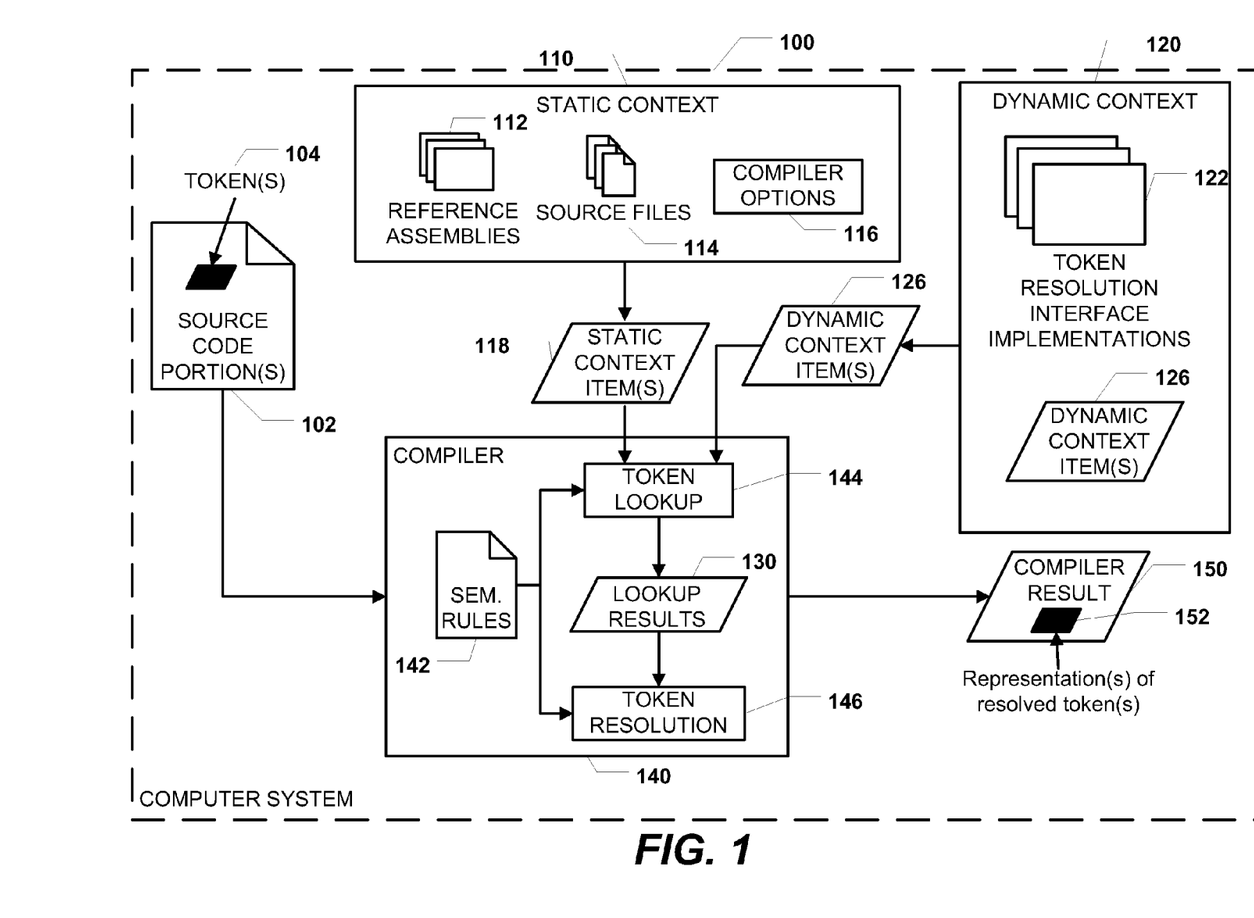
FIG. 1 is a diagram to illustrate a particular embodiment of a computer system that is operable to dynamically resolve tokens during compilation.

Referring to FIG. 1, a first embodiment of a computer system 100 that is operable to dynamically resolve tokens during compilation is illustrated. The computer system 100 includes a compiler 140. The computer system 100 also includes a static context 110 of the compiler 140 and a dynamic context 120 of the compiler 140.

The static context 110 of the compiler 140 may include one or more reference assemblies 112, one or more source files 114, one or more compiler options 116, other types of static context items, or any combination thereof. For example, the one or more reference assemblies 112 may include user-provided reference assemblies, default reference assemblies, or any combination thereof.

The dynamic context 120 of the compiler 140 may generally include context items that are not easily captured in the static context 110 of the compiler 140. Dynamic token resolution as disclosed herein may be performed based on implementations (e.g., user-defined implementations) of one or more token resolution interfaces. In a particular embodiment, the one or more token resolution interfaces include a type resolution interface and a variable resolution interface (e.g., provided by the compiler 140). For example, the dynamic context 120 may include one or more token resolution interface implementations 122.

The compiler 140 may include token lookup logic 144 and token resolution logic 146. In a particular embodiment, the token lookup logic 144 is operable to query the static context 110 and the dynamic context 120 (e.g., in response to determining that a particular token is not a reserved keyword of the compiler 140). For example, querying the static context 110 may result in one or more static context items 118. As another example, querying the dynamic context 120 may result in one or more dynamic context items 126. In a particular embodiment, querying the dynamic context 120 results in the creation of the dynamic context items 126, where the dynamic context items 126 are identified by the token resolution interface implementations 122. The created dynamic context items 126 may optionally be cached, so that the compiler 140 may subsequently resolve the token without further querying of the token resolution interface implementations 122. The static context items 118 and the dynamic context items 126 may be aggregated to form the lookup results 130. The token resolution logic 146 may select a particular lookup result of the lookup results 130 to resolve the token, where the particular lookup result is selected independently of whether the particular lookup result was sourced from the static context 110 or from the dynamic context 120. The token lookup logic 144 and the token resolution logic 146 may operate in accordance with semantic rules of the compiler 142.

In a particular embodiment, operation at the system 100 may include the compiler 140 compiling one or more source code portions 102. The source code portions 102 may represent one or more complete source files (e.g., the source files 114) or portions of one or more source files. The source code portions 102 may include one or more tokens 104 that undergo a token resolution process during compilation by the compiler 140. In a particular embodiment, token resolution is initiated for tokens that are not reserved keywords of the compiler 140. For example, upon initiation of the token resolution process, the token lookup logic 144 may query the static context 110 and the dynamic context 120. The token lookup logic 144 may make the queries in accordance with semantic rules 142 of the compiler 140. In response to the queries, the compiler 140 may receive one or more static context items 118 and one or more dynamic context items 126. The one or more static context items 118 and one or more dynamic context items 126 may be aggregated to form the lookup results 130 of the tokens 104.

The token resolution logic 146 may select, for each of the tokens 104, a particular lookup result from the returned lookup results 130 based on the semantic rules 142 of the compiler 140. For example, the lookup results 130 may include a potential type, a potential namespace, and/or a potential variable that the token could be referring to. The semantic rules 142 may indicate how to select between the potential type, the potential namespace, and/or the potential variable (e.g., based on the location of the token in the source code or based on how the token is being used in the source code). The particular lookup results are selected independent of source (i.e., independently of whether they were returned by the static context 110 or by the dynamic context 120). The selected particular lookup results may be used by the compiler 140 in generating a compiler result 150, where the compiler result 150 includes representations 152 of the resolved tokens 104. A compiler result 150 may be created for each of the source code portions 102. For example, the source code portions 102 may include N (where N is a positive integer) class source files and the compiler 140 may generate a separate compiled class binary for each of the N class source files.

The dynamic context items 126 may include namespaces, types, variables, and other dynamic context items. The dynamic context items 126 may be used to resolve the tokens 104. For example, the dynamic context items 126 may include definitions or other syntactical/semantic information of the tokens 104. In a particular embodiment, when a "new" (e.g., previously unencountered) dynamic context item is returned by the token resolution interface implementations 122, the "new" dynamic context item is cached at the dynamic context 120. Cached dynamic context items may be available to the compiler 140 for the remainder of the compilation process and may be used to resolve subsequently encountered tokens, thereby reducing a total number of queries of the token resolution interface implementations. Thus, the dynamic context 120 may "grow" as needed during the compilation process.

For example, there may be a type, a variable, and a namespace each having the name "x." The first time "x" is encountered during compilation, three dynamic context items may be returned: a type, a variable, and a namespace. Each of the three dynamic context items may be cached. Subsequent queries for "x" may return all three cached dynamic context items. Each time another instance of "x" is encountered, the appropriate cached dynamic context item (type, variable, or namespace) may be selected, based on the semantic rules 142 of the compiler, to resolve that particular instance of "x."

It should be noted that the descriptions of operation at the system 100 provided herein are for exemplary purposes only and are not to be limiting. The system 100 may also include other embodiments and operations. For example, querying the static context 110 and the dynamic context 120 for a particular token may result in both static context items and dynamic context items, one of static context items or dynamic context items but not the other, or neither static context items nor dynamic context items. When neither static context items nor dynamic context items are returned, the compiler 140 may use an alternate lookup procedure in accordance with the semantic rules 142 or may return a compiler error. The compiler 140 may also use an alternate lookup procedure in accordance with the semantic rules 142 or may return a compiler error when ambiguous lookup results are returned. In yet another embodiment, even though static context item(s) and/or dynamic context item(s) are returned, the semantic rules 142 may indicate that none of the returned context items are appropriate to resolve the token.

In one embodiment, the source code portions 102 include Visual Basic .Net source code. In the case of Visual Basic .Net source code, the source code portions 102 may include one or more extensible markup language (XML) expressions, one or more language integrated query (LINQ) expressions, or any combination thereof. It should be noted that Visual Basic .Net is merely an example of a computer language. Dynamic token resolution as disclosed herein may be performed in conjunction with any computer language.

As an illustrative example, one or more of the source code portions 102 may include "MyType.MySharedMember," and the token resolution interface implementations 122 may describe how to resolve the token "MyType." The following sample code illustrates a particular embodiment of an implementation of a type resolution interface "ITypeScope." The type resolution interface "ITypeScope" may be provided by a compiler, and a user (e.g., a programmer) may choose whether or not to implement the type resolution interface.

```
Public class TypeScope : Implements ITypeScope
    Public Function FindTypes(ByVal typeName As String,
    ByVal nsPrefix As String) _
        As System.Type( ) Implements ITypeScope.FindTypes
        If GetType(MyType).Namespace = nsPrefix AndAlso
        "MyType" = typeName Then
            Return {GetType(MyType)}
        End If
        Return Nothing
    End Function
    Public Function NamespaceExists(ByVal ns As String) As Boolean _
    Implements ITypeScope.NamespaceExists
        Return GetType(MyType).Namespace = ns
    End Function
End Class
Public Class MyType
    Public Shared MySharedMember As Integer
End Class
```

As another illustrative example, one or more of the source code portions 102 may include the source code "x+2," and the token resolution interface implementations 122 may describe how to resolve the token "x." The following sample code illustrates a particular embodiment of an implementation of a variable resolution interface "IScriptScope." The variable resolution interface "IScriptScope" may be provided by a compiler, and a user (e.g., a programmer) may choose whether or not to implement the variable resolution interface.

```
Public class ScriptScope Implements IScriptScope
    Public Function FindVariable(ByVal name As String)
    As System.Type _
        Implements IScriptScope.FindVariable
        If name = "x" Then
            Return GetType(Integer)
        End If
        Return Nothing
    End Function
End Class
```

It will be appreciated that the system 100 of FIG. 1 may enable "as needed" creation and/or caching of the dynamic context items 126 (e.g., live in-memory objects) in the dynamic context 120. For example, when the compiler 140 is initialized, the dynamic context 120 may include the token resolution interface implementations 122, but not any of the dynamic context items 126. During compilation, the dynamic context items 126 may be created as needed to resolve tokens 104. For example, it may be inconvenient to regenerate classes or other code constructs to represent a database schema each time the database schema changes (possibly frequently). Doing so may be costly in terms of processing time and may be redundant if the code to be compiled does not make use of the generated code constructs. The system 100 of FIG. 1 may improve the efficiency of token resolution, since the compiler 140 may create the additional dynamic context items 126 as needed, thereby resulting in a smaller footprint in memory.

It will also be appreciated that dynamic token resolution as illustrated in FIG. 1 may be incorporated into existing compilers without modifying existing semantic rules of the existing compilers. The compiler 140 selects lookup results for use in token resolution independently of source (e.g., independently of whether the lookup results are sourced from the dynamic context 120 or by the static context 110). Thus, the system 100 of FIG. 1 may conceptually "merge" the static context 110 and the dynamic context 120 for the purposes of token resolution. In addition, while the token interface implementations 122 may indicate how to resolve a token (i.e., provide users with a mechanism to provide items to the compiler 140), the token interface implementations 122 may not indicate when the compiler creates the dynamic context items 126. Compilers decide when to create the dynamic context items 126 in accordance with existing policies regarding the introduction of context information.

Figure 2:
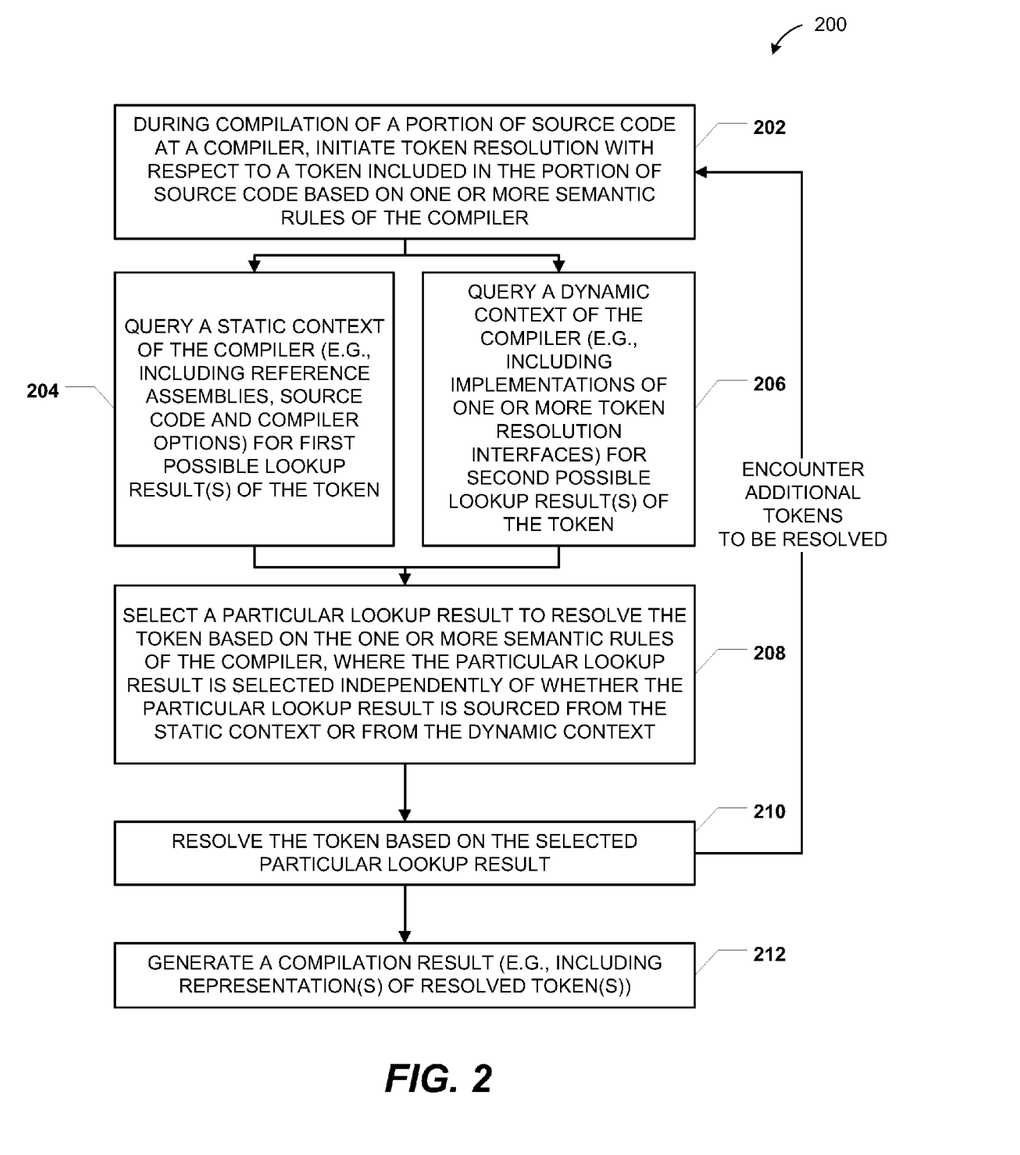
FIG. 2 is a diagram to illustrate a particular embodiment of a method of dynamically resolving tokens during compilation.

Referring to FIG. 2, a particular embodiment of a method 200 of dynamically resolving tokens is illustrated. In an illustrative embodiment, the method 200 may be performed at the system 100 of FIG. 1.

The method 200 includes, during compilation of a portion of source code at a compiler, initiating token resolution with respect to a token included in the portion of source code based on one or more semantic rules of the compiler, at 202. For example, in FIG. 1, the compiler 140 may initiate token resolution with respect to a particular token (e.g., one of the tokens 104). To illustrate, the particular token may be "MyType," as described with reference to FIG. 1.

The method 200 includes querying a static context of the compiler for first possible lookup result(s) of the token, at 204, and querying a dynamic context of the compiler for second possible lookup result(s) of the token, at 206. In a particular embodiment, the static context includes reference assemblies, source code, and compiler options. In a particular embodiment, the dynamic context includes implementations of one or more token resolution interfaces. The queries may result in zero or more static context items and zero or more dynamic context items. When neither static context items nor dynamic context items are returned, the method 200 may include executing some other token lookup procedure or outputting a compiler error in accordance with the semantic rules of the compiler. Alternately, the queries may result in only static context item(s) being returned, only dynamic context item(s) being returned, or both static context item(s) and dynamic context item(s) being returned. To illustrate, a dynamic context item identified by the implementation of "ITypeScope" described with reference to FIG. 1 may be created and returned. The dynamic context item may also optionally be cached.

When the queries return at least one lookup result (e.g., at least one static context item or at least one dynamic context item), the method 200 further includes selecting a particular lookup result to resolve the token based on one or more semantic rules of the compiler, at 208. The particular lookup result is selected independently of whether the particular lookup result is sourced from the static context or from the dynamic context. For example, in FIG. 1, the token resolution logic 146 may select a particular lookup result of the lookup results 130.

The method 200 includes resolving the token based on the selected particular lookup result, at 210. During compilation, the compiler may encounter additional tokens that are to be resolved. The method 200 may return to 202 when such additional tokens are encountered. For example, a second token (e.g., "x") included in the portion of source code may be encountered. The compiler may query the static context and the dynamic context for lookup results of the second token. When at least one lookup result of the second token is returned, a second particular lookup result may be selected to resolve the second token based on the semantic rules of the compiler. To illustrate, when the token is "x," the second particular lookup result may be provided by the implementation of "IScriptScope" described with reference to FIG. 1. The second token may be resolved based on the second particular lookup result. The second particular lookup result is also selected independently of whether it is sourced from the static context or from the dynamic context. In a particular embodiment, when the compiler subsequently encounters "MyType" or "x," the compiler retrieves cached dynamic context items to resolve the tokens without re-querying token resolution interface implementations.

The method 200 includes generating a compilation result, at 212. In a particular embodiment, the compilation result includes representation(s) of resolved token(s). For example, in FIG. 1, the compiler 140 may generate the compilation result 150, and the compilation result 150 includes the one or more representations 152 of the tokens 104.

It will be appreciated that the method 200 of FIG. 2 may enable "as needed" creation of dynamic context items. Thus, the dynamic context of a compiler may "grow" as needed during code compilation. It will also be appreciated that the method 200 of FIG. 2 may be executed the first time an unknown token is encountered by the compiler, but not during subsequent encounters, because the compiler may cache the potential meanings of the token after the first encounter.

Figure 3:
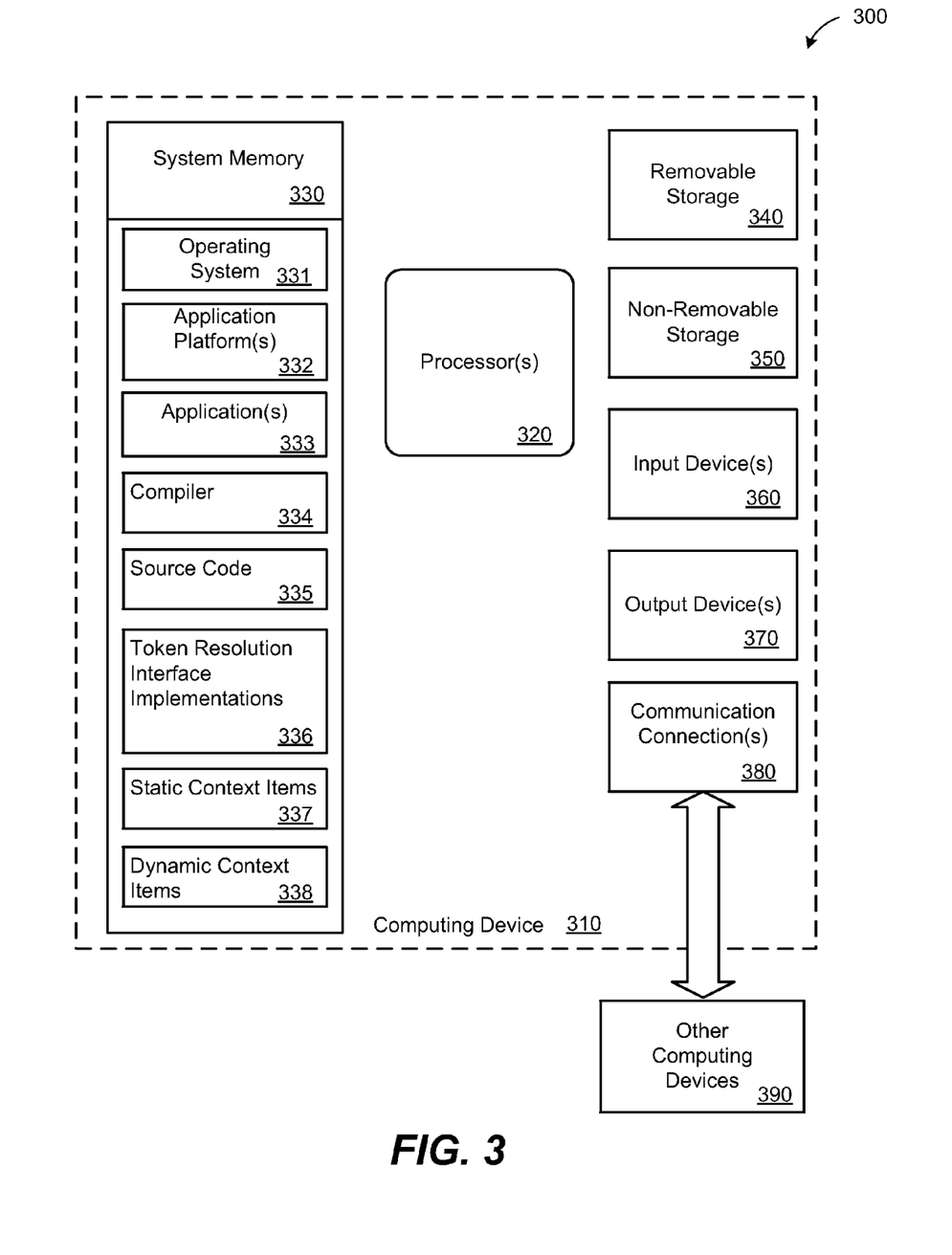
FIG. 3 is a block diagram of a computing environment including a computing device operable to support embodiments of computer-implemented methods, computer program products, and system components as illustrated in FIGS. 1-2.

FIG. 3 depicts a block diagram of a computing environment 300 including a computing device 310 that is operable to support embodiments of computer-implemented methods, computer program products, and system components according to the present disclosure. In an illustrative embodiment, the computing device 310 includes the computer system 100 of FIG. 1 or components thereof. Moreover, components of the computer system 100 of FIG. 1 may be implemented using the computing device 310 or a portion thereof.

The computing device 310 includes at least one processor 320 and a system memory 330. Depending on the configuration and type of computing device, the system memory 330 may be volatile (such as random access memory or "RAM"), non-volatile (such as read-only memory or "ROM," flash memory, and similar memory devices that maintain stored data even when power is not provided), or some combination of the two. The system memory 330 typically includes an operating system 331, one or more application platforms 332, one or more applications 333, and other program instructions. The system memory 330 also includes a compiler 334, source code 335, token resolution interface implementations 336, one or more static context items 337, and one or more dynamic context items 338. For example, the compiler 334 may include the compiler 140 of FIG. 1. The source code 335 may include the source code portions 102 and the source files 114 of FIG. 1. The token resolution interface implementations 336 may include the token resolution interface implementations 122 of FIG. 1. The static context items 227 may include the static context items 118 of FIG. 1. The dynamic context items 338 may include the dynamic context items 126 of FIG. 1.

The computing device 310 may also have additional features or functionality. For example, the computing device 310 may also include removable and/or non-removable additional data storage devices, such as magnetic disks, optical disks, tape, and standard-sized or flash memory cards. Such additional storage is illustrated in FIG. 3 by removable storage 340 and non-removable storage 350. Computer storage media may include volatile and/or non-volatile storage and removable and/or non-removable media implemented in any technology for storage of information such as computer-readable instructions, data structures, program components or other data. The system memory 330, the removable storage 340 and the non-removable storage 350 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 310. Any such computer storage media may be part of the computing device 310.

The computing device 310 may also have input device(s) 360, such as a keyboard, mouse, pen, voice input device, touch input device, etc. Output device(s) 370, such as a display, speakers, a printer, etc. may also be included. The computing device 310 also contains one or more communication connections 380 that allow the computing device 310 to communicate with other computing devices 390 over a wired or a wireless network.

It will be appreciated that not all of the components or devices illustrated in FIG. 3 or otherwise described in the previous paragraphs are necessary to support embodiments as herein described. For example, the removable storage 340 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
during compilation of a portion of source code at a compiler:
initiating token resolution with respect to a token included in the portion of source code;
querying a static context of the compiler and a dynamic context of the compiler;
aggregating static context items received as a result of the static context query and dynamic context items received as a result of the dynamic context query to form lookup results;
selecting a particular lookup result of the lookup results to resolve the token based on one or more semantic rules of the compiler, wherein the particular lookup result is selected independently of whether the particular lookup result is sourced from the static context or from the dynamic context;
resolving the token based on the selected particular lookup result;
creating a dynamic context item when a previously unencountered dynamic context item is returned by a token resolution interface; and
caching the created dynamic context item, so that the created dynamic context item is retrievable to resolve instances of the token that are subsequently encountered by the compiler without further querying of the token resolution interface.

2. The computer-implemented method of claim 1, wherein the static context comprises one or more reference assemblies, one or more source files, one or more compiler options, or any combination thereof.

3. The computer-implemented method of claim 1, wherein the dynamic context comprises one or more implementations of one or more token resolution interfaces.

4. The computer implemented method of claim 3, wherein the token resolution interfaces include at least one type resolution interface, at least one variable resolution interface, or any combination thereof.

5. The computer-implemented method of claim 3, further comprising creating a dynamic context item, wherein the dynamic context item is identified by a particular implementation of a token resolution interface.

6. The computer-implemented method of claim 5, wherein the created dynamic context item comprises a namespace identified by a particular implementation of a type resolution interface.

7. The computer-implemented method of claim 5, wherein the created dynamic context item comprises a type identified by a particular implementation of a type resolution interface.

8. The computer-implemented method of claim 5, wherein the created dynamic context item comprises a variable identified by a particular implementation of a variable resolution interface.

9. The computer-implemented method of claim 5, further comprising caching the created dynamic context item.

10. The computer-implemented method of claim 9, wherein the cached dynamic context item is retrievable to resolve instances of the token that are subsequently encountered by the compiler without further querying of the token resolution interface implementations.

11. The computer-implemented method of claim 1, wherein the token comprises a reference to a type, a reference to a variable, or a reference to a namespace.

12. The computer-implemented method of claim 1, further comprising generating a compilation result comprising a representation of the resolved token.

13. The computer-implemented method of claim 1, wherein the created dynamic context item is cached for a remainder of the compilation of the portion of source code.

14. A computer system, comprising:
a processor; and
a compiler executable by the processor to:
initiate compilation of a portion of source code;
initiate token resolution with respect to a first token included in the portion of source code and a second token included in the portion of source code;
query static context of the compiler and dynamic context of the compiler;
receive one or more static context items associated with the first token, one or more static context items associated with the second token, one or more dynamic context items associated with the first token, and one or more dynamic context items associated with the second token;
aggregate the static context items associated with the first token and the dynamic context items associated with the first token to produce a first aggregate;
aggregate the static context items associated with the second token and the dynamic context items associated with the second token to produce a second aggregate;

select a first particular lookup result of the first aggregate to resolve the first token based on one or more semantic rules of the compiler, wherein the first particular lookup result is selected independently of whether the first particular lookup result is sourced from the static context or from the dynamic context;

select a second particular lookup result of the second aggregate to resolve the second token based on the one or more semantic rules of the compiler, wherein the second particular lookup result is selected independently of whether the second particular lookup result is sourced from the static context or from the dynamic context;

resolve the first token based on the selected first particular lookup result;

resolve the second token based on the selected second particular lookup result;

create a dynamic context item when a previously unencountered dynamic context item is returned by a token resolution interface of the compiler; and cache the created dynamic context item, so that the created dynamic context item is retrievable to resolve instances of the token that are subsequently encountered by the compiler without further querying of the token resolution interface.

15. The computer system of claim 14, wherein the first token or the second token comprises a reference to a namespace.

16. The computer system of claim 14, wherein the first token or the second token comprises a reference to a type.

17. The computer system of claim 14, wherein the first token or the second token comprises a reference to a variable.

18. A computer memory comprising instructions that, when executed by a computer system, cause the computer system to:

during compilation of a portion of source code at a compiler, initiate token resolution with respect to a token included in the portion of source code;

query a static context of the compiler and a dynamic context of the compiler;

receive one or more static context items as a result of the static context query and one or more dynamic context items as a result of the dynamic context query;

aggregate the static context items and the dynamic context items to form lookup results;

select a particular lookup result of the lookup results to resolve the token based on one or more semantic rules of the compiler, wherein the particular lookup result is selected independently of whether the particular lookup result is sourced from the static context or from the dynamic context;

create a dynamic context item responsive to a particular dynamic context query for a particular token when a previously unencountered dynamic context item is returned by the dynamic context; and cache the created dynamic context item, so that the created dynamic context item is retrievable to resolve instances of dynamic context queries based on the particular token that are subsequently encountered by the compiler without further querying of the dynamic context.

19. The computer memory of claim 18, wherein the token is a reference to a type, a reference to a variable, or a reference to a namespace.

20. The computer memory of claim 18, wherein the instructions, when executed by the computer system, cause the computer system to generate a compilation result comprising a representation of the resolved token.

* * * * *